W. JOHNS.
LICENSE PLATE HOLDER.
APPLICATION FILED DEC. 7, 1920.
1,432,560.
Patented Oct. 17, 1922.
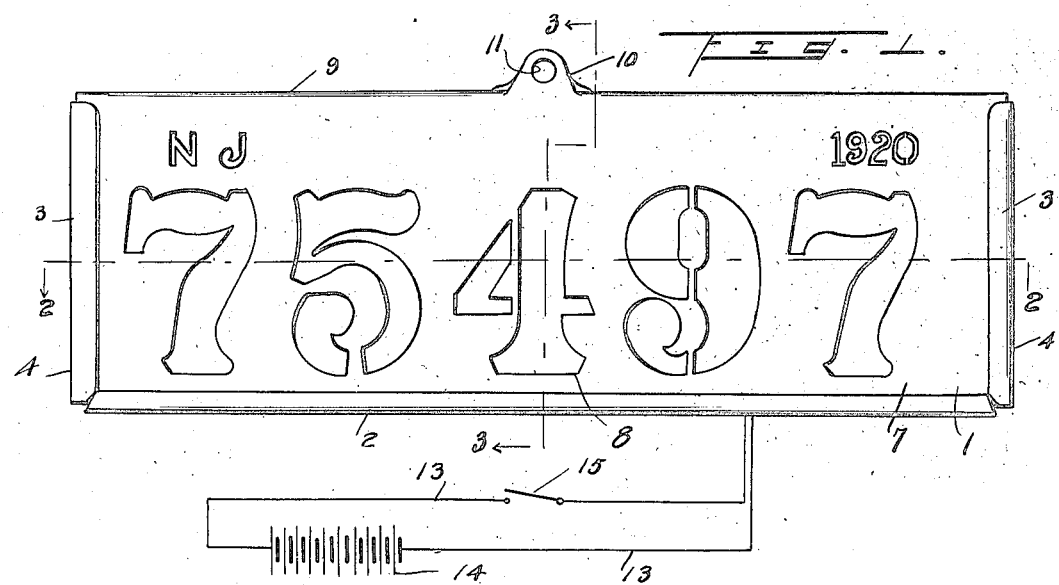
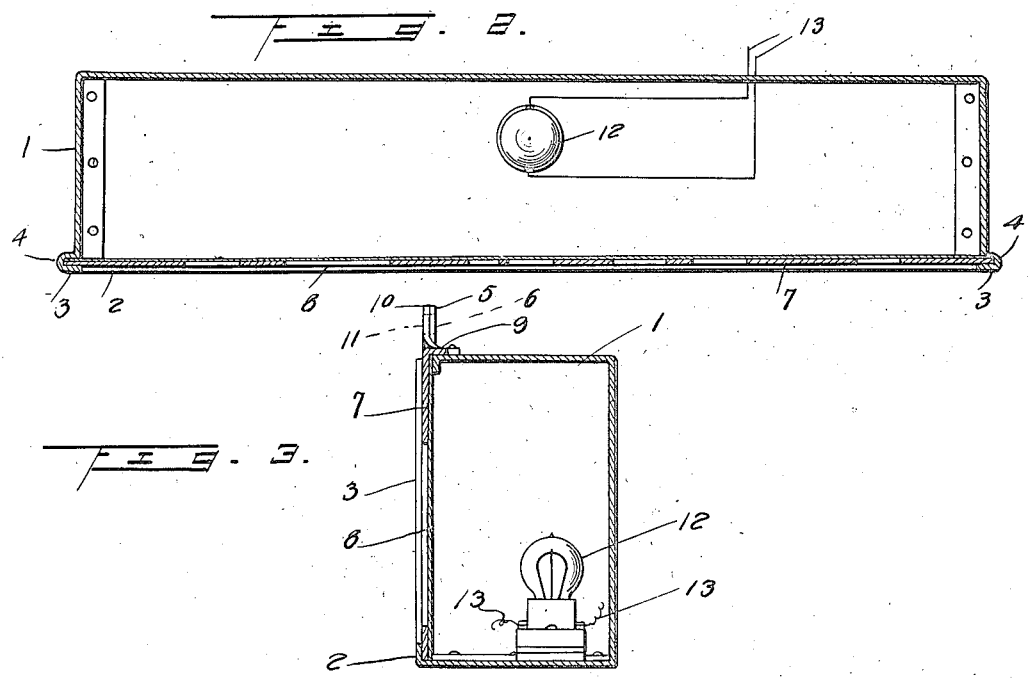
INVENTOR.
W. Johns
BY
ATTORNEY.

Patented Oct. 17, 1922.

1,432,560

UNITED STATES PATENT OFFICE.

WILLIAM JOHNS, OF PASSAIC, NEW JERSEY.

LICENSE-PLATE HOLDER.

Application filed December 7, 1920. Serial No. 428,916.

*To all whom it may concern:*

Be it known that I, WILLIAM JOHNS, a citizen of the United States, residing at Passaic, in the county of Passaic and State of New Jersey, have invented certain new and useful Improvements in License-Plate Holders; and I do hereby declare the following to be a full, clear, and exact description of the invention, such as will enable others skilled in the art to which it appertains to make and use the same.

This invention relates to a license plate holder adapted to be used upon an automobile lamp and it consists in the novel features hereinafter described and claimed.

An object of the invention is to provide means upon the body of the lamp for retaining a license plate in a manner that the plate may be readily observed in the daytime and when the lamp is not lighted and the plate may be clearly observed at night and when the lamp is lighted.

With the above object in view the license plate holder comprises a lamp body provided at appropriate edges with one inturned flange and three outwardly disposed flanges, the outwardly disposed flanges having returned bend portions adapted to receive the plate. A lug is mounted upon the top side of the body and is provided with an opening and the plate is provided with an opening. These openings are adapted to register with each other when the plate is in position upon the body, and the bail of a lock may be turned through the registering openings whereby the plate is secured in position in the body of the lamp. The body of the lamp may be illuminated by an electric bulb or a series of electric bulbs which are electrically connected with a source of electricity, as for instance a series of batteries, and means is provided for closing the circuit from the batteries to the bulbs.

In the accompanying drawing:

Figure 1 is a side elevation of the license plate holder.

Figure 2 is a sectional view on the line 2—2 of Figure 1,

Figure 3 is a sectional view on the line 3—3 of Figure 1.

The license plate holder comprises a body 1 which is preferably rectangular in form and made of sheet metal. The body 1 is open at one side and provided at one of its longitudinal edges with an inturned flange 2. The body 1 is provided along the remaining three edges at the open sides thereof with outwardly disposed flanges 3, each having a returned bend portion 4. The body 1 is provided upon its top side and at a point midway between its ends with an upstanding lug 5, the outer surface of which is substantially flush with the outer surface of the flange 2. The lug 5 is provided with an opening 6. The license plate 7 is provided with a series of characters of numbers 8 cut therein and which serve to identify the plate. The plate 7 is provided at its upper edge with an angularly disposed flange 9 which is adapted to fit against the upper surface of the top of the body 1 when the edge portions of the plate 7 are received between the returned bend portion 4 and the body portions of the flanges 3. The plate 7 is provided at its upper edge with an upstanding lug 10 having an opening 11 and the opening 11 is adapted to register with the opening 6 in the lug 5 when the plate 7 is inserted in position at the open side of the body 1. An electric bulb 12 is mounted within the body 1 and is connected by means of wires 13 with batteries 14, there being a suitable switch 15 connected with the wires that connect the batteries and the bulb and which may be closed, it illuminates the bulb.

The plate is provided with openings which form the characters 8 and the identification of the number plate and the machine to which it is applied may be established.

When the plate is in position in the returned bend portions 4 of the flanges 3 the flange 9 of the plate overlaps the edge portion of the top side of the body 1 and prevents moisture from entering the interior of the body.

At the end of the year and when the license under which the number plate is issued has expired the plate may be removed from the body and new plate substituted in its stead.

From the foregoing description taken in conjunction with the accompanying drawing it will be seen that a number plate holder of simple and durable structure is provided and that the same may be conveniently used for displaying the plate to establish the identification thereof and the machine to which it is applied and the plate holder may also serve as a light signal and used as such upon the automobile.

Having described the invention what is claimed is:

A sign plate, a mounting therefor, said plate and mounting having means offset at the top thereof and provided with apertures to receive a fastening means, and said plate having a flange disposed on opposite sides of said means to suspend it from the top of the mounting to insure registration of the apertures and to reduce rattling.

In testimony whereof I affix my signature in presence of two witnesses.

WILLIAM JOHNS.

Witnesses:
JOHN H. McGUIRE,
CHARLES McGOWAN.